United States Patent
Axmon et al.

(10) Patent No.: US 10,536,316 B2
(45) Date of Patent: Jan. 14, 2020

(54) NB-IOT RECEIVER OPERATING AT MINIMUM SAMPLING RATE

(71) Applicant: Telefonaktiebolaget LM Ericsson (publ), Stockholm (SE)

(72) Inventors: Joakim Axmon, Limhamn (SE); Dandan Hao, Beijing (CN); Bengt Lindoff, Bjärred (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/076,202

(22) PCT Filed: Feb. 10, 2017

(86) PCT No.: PCT/EP2017/053013
§ 371 (c)(1),
(2) Date: Aug. 7, 2018

(87) PCT Pub. No.: WO2017/140590
PCT Pub. Date: Aug. 24, 2017

(65) Prior Publication Data
US 2019/0260625 A1     Aug. 22, 2019

(30) Foreign Application Priority Data
Feb. 15, 2016 (WO) ............... PCT/CN2016/073778

(51) Int. Cl.
*H04K 1/10* (2006.01)
*H04L 27/26* (2006.01)
*H04J 11/00* (2006.01)

(52) U.S. Cl.
CPC ...... *H04L 27/2647* (2013.01); *H04J 11/0023* (2013.01); *H04J 11/0093* (2013.01); *H04L 27/2605* (2013.01); *H04L 27/2662* (2013.01)

(58) Field of Classification Search
CPC ............. H04L 27/2647; H04L 27/2605; H04J 11/0023; H04J 11/0093
See application file for complete search history.

(56) References Cited

U.S. PATENT DOCUMENTS

| 6,925,112 B1 | 8/2005 | Morejon et al. |
| 7,573,944 B2 | 8/2009 | Chang et al. |

(Continued)

FOREIGN PATENT DOCUMENTS

| RU | 2369030 C2 | 9/2009 |
| WO | 3703509 A1 | 1/1997 |

(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Requirements for support of radio resource management (Release 12)", Technical Specification, 3GPP TS 36.133 V12.7.0, Mar. 1, 2015, pp. 1-1014, 3GPP, France.

(Continued)

*Primary Examiner* — Dhaval V Patel
(74) *Attorney, Agent, or Firm* — Coats & Bennett, PLLC

(57) ABSTRACT

The solution presented herein discloses a method of reducing inter-symbol jitter caused while processing each of a plurality of OFDM symbols in a received signal. For each of the plurality of OFDM symbols, the method comprises receiving a plurality of radio samples produced by a sampling of an OFDM symbol at a reduced sampling rate, where the reduced sampling rate causes inter-symbol jitter between the plurality of OFDM symbols. The method further comprises determining a sample offset corresponding to a symbol number for the OFDM symbol, transforming the samples of the OFDM symbol into a plurality of frequency-domain resource elements, and determining a phase offset (Continued)

for each of the resource elements using the sample offset. The method then reduces the inter-symbol jitter by rotating each resource element using the corresponding phase offset to generate phase-rotated resource elements. Corresponding narrow-band wireless receiver, narrow-band wireless receiver apparatus, jitter compensation circuit and computer program product are also disclosed.

26 Claims, 9 Drawing Sheets

(56) References Cited

U.S. PATENT DOCUMENTS

| | | | |
|---|---|---|---|
| 8,279,988 B2 | 10/2012 | McKown | |
| 8,687,617 B2 | 4/2014 | Agrawal et al. | |
| 2003/0156534 A1 | 8/2003 | Coulson et al. | |
| 2004/0184551 A1* | 9/2004 | Liu | H04L 27/2662 375/260 |
| 2005/0084025 A1* | 4/2005 | Chen | H04L 27/2662 375/260 |
| 2007/0064839 A1 | 3/2007 | Luu | |
| 2007/0274416 A1* | 11/2007 | Ishii | H04L 27/066 375/321 |
| 2008/0063034 A1 | 3/2008 | Yang et al. | |
| 2008/0123592 A1* | 5/2008 | Popovic | H04L 5/0023 370/330 |
| 2008/0292027 A1* | 11/2008 | Liu | H04B 1/0003 375/340 |
| 2010/0166050 A1 | 7/2010 | Aue | |
| 2010/0260276 A1 | 10/2010 | Orlik et al. | |
| 2011/0224996 A1 | 9/2011 | Wang et al. | |
| 2012/0032855 A1 | 2/2012 | Reede et al. | |
| 2013/0005327 A1 | 1/2013 | Flanagan | |
| 2014/0233723 A1 | 8/2014 | Lou et al. | |
| 2014/0256277 A1* | 9/2014 | Ki | H04L 27/01 455/296 |
| 2015/0139190 A1* | 5/2015 | Patel | H04W 36/0094 370/331 |
| 2017/0033887 A1* | 2/2017 | Lei | H04W 4/70 |
| 2018/0123845 A1 | 5/2018 | Hill et al. | |
| 2019/0013913 A1* | 1/2019 | Suzuki | H04J 11/00 |

FOREIGN PATENT DOCUMENTS

| | | |
|---|---|---|
| WO | 2017013533 A1 | 1/2017 |
| WO | 2017140591 A1 | 8/2017 |

OTHER PUBLICATIONS

Nieul Ltd, et al., "NB-Clot—Introduction", 3GPP GERAN Adhoc#3 on FS_IoT_LC, Jun. 29, 2015, pp. 1-5, GPC150389, Agenda item 1.4.2.5, 2.4.1.5.

Huawei Technologies Co. Ltd., "NB M2M Overview of the Physical Layer Design", 3GPP TSG GERAN #63, Ljubljana, Slovenia, Aug. 25, 2014, pp. 1-12, GP-140563, Agenda Item: 7.1.5.3.5.

Qualcomm Incorporated, "Narrow band OFDMA based proposal for GERAN Cellular IoT", Discussion, 3GPP TSG GERAN #64, San Francisco, USA, Nov. 17, 2014, pp. 1-17, Tdoc GP-140839.

Intel Corporation, "On Device complexity for NB-IoT", 3GPP TSG RAN WG1 Meeting #83, Anahein, USA, Nov. 16, 2015, pp. 1-10, R1-156524, 3GPP.

Ericsson, "Analysis of Uplink Transmit Timing in IB-ioT", 3GPP TSG RAN WG4 Meeting #78bis, San Jose del Cabo, Mexico, Apr. 11, 2016, pp. 1-7, R4-161945, 3GPP.

Qualcomm Incorporated, "On DL Tone Spacing for Standalone Operation", 3GPP TSG RAN WG1#83, Anaheim, US, Nov. 15, 2015, pp. 1-7, R1-157065, 3GPP.

\* cited by examiner

NB-IOT RECEIVER OPERATING AT MINIMUM SAMPLING RATE

BACKGROUND

Internet-of-Things (IoT) is the vision of virtually all objects being connected to the internet, where the objects can be anything from simple sensors to sophisticated machinery such as vehicles. The Third Generation Partnership Project (3GPP) is currently specifying a new kind of radio access technology (RAT) with strong commonalities with Long Term Evolution (LTE) but operating over a narrower bandwidth. The new RAT is referred to as Narrow-Band IoT (NB-IoT). Specification work is currently ongoing, and the following decisions regarding deployment scenarios and duplex modes, downlink channels and signals, uplink channels and signals, and channel raster, were made at the 3GPP RAN1#83 meeting in November 2015.

Regarding deployment scenarios and duplex modes, three deployment scenarios were specified:
  standalone deployment;
  deployment in guard band between conventional LTE cells; and
  deployment within the band of conventional LTE cells.

Both Frequency Division Duplex (FDD) and Time Division Duplex (TDD) modes are in the scope but are covered in different releases (e.g., FDD is in Release 13 but the solution shall be forward compatible with TDD which is introduced in a later release).

Regarding downlink channels and signals, the downlink subcarrier spacing is proposed to be 15 kHz and the NB-IoT downlink system bandwidth to be 200 kHz, with an efficient bandwidth of 180 kHz (e.g., the equivalent to a physical resource block in a conventional LTE cell). Two configurations for cyclic prefix are considered: normal and extended. FIG. 4 shows an exemplary downlink resource grid (in a time-frequency representation) for a Normal Cyclic Prefix (NCP) and for an Extended Cyclic Prefix (ECP), where the shaded areas indicate where NB-IoT-specific synchronization signals may be scheduled. The number of transmission ports used by the network node is assumed to be one or two, where for the latter Space-Frequency Block Coding (SFBC) is assumed. The NB-IoT-specific channels that have been specified to some extent are the broadcast channel (NB-PBCH), the downlink control channel (NB-PDCCH or NPDCCH), and the downlink shared channel (NB-PDSCH). It shall be noted that the nomenclature is not finalized, but the indicated names are used here to distinguish the channels from their counterparts in regular LTE cells. System information is provided via a master information block (MIB) that is transmitted on the NB-PBCH and for which format and allocation is known in advance, and via system information block(s) that are transmitted on NB-PDSCH.

Further, new synchronization signals, e.g., Narrowband Primary Synchronization Signal (NB-PSS or NPSS) and Narrowband Secondary Synchronization Signal (NB-SSS or NSSS), are introduced, with, e.g., a single instance of NB-PSS and 504 instances of NB-SSS. The synchronization signals occupy a fixed number of Orthogonal Frequency Division Multiplexing (OFDM) symbols in each subframe that is carrying synchronization signals. The synchronization signals do not occupy the first 3 OFDM symbols in the subframe, and for the scenario where NB-IoT is deployed in the bandwidth of a regular LTE cell, Cell-specific Reference Signals (CRSs) of that regular LTE cell will puncture the NB-PSS or NB-SSS if necessary. For normal cyclic prefix, it is assumed that the NB-PSS and NB-SSS span 9 or 11 OFDM symbols (to be down-selected to one value), and that within the span 6 to 11 OFDM symbols carry the synchronization information (to be down-selected to one value). For extended cyclic prefix, the corresponding figures are 9 OFDM symbols and 6 to 9 OFDM symbols, respectively. For the in-band scenario, NB-PSS and NB-SSS are boosted by 6 dB relative to the CRS power level in the regular LTE cell. The repetition rates of NB-PSS and NB-SSS might differ. For example, repetition rates of 20 ms and 80 ms, respectively, have been proposed.

Regarding uplink channels and signals, two solutions are proposed for uplink transmissions: single-tone transmissions using either of two configurations, e.g., 3.75 kHz and 15 kHz bandwidth, and multi-tone transmission using 15 kHz subcarrier spacing in a Single Carrier Frequency Division Multiple Access (SC-FDMA) scheme. Details regarding uplink signals are still under investigation.

Regarding channel raster, the channel raster is assumed to be 100 kHz although sparser channel raster cannot be precluded as it is still under discussion in the standardization body.

Current LTE solutions either operate at a sampling rate that may undesirably increase the financial and/or power costs of the corresponding devices, or operate at cost-efficient sampling rate that undesirably degrades performance. Therefore, there remains a need for improved processing solutions, particularly for NB-IoT devices.

SUMMARY

The solution presented herein compensates for inter-symbol jitter caused when Orthogonal Frequency Division Multiplexing (OFDM) symbols are sampled at a reduced sampling rate, e.g., at a sampling rate less than that at which an inter-symbol distance can be represented by an integer number of samples. To that end, the solution presented herein rotates each resource element produced for a sampled OFDM symbol by a phase offset corresponding to that resource element, where the phase offset corresponds to a sample offset representing the difference between the actual sample start time and the desired sample start time.

One exemplary embodiment comprises a method of reducing inter-symbol jitter caused while processing each of a plurality of OFDM symbols in a received signal. For each of the plurality of OFDM symbols, the method comprises receiving a plurality of radio samples produced by a sampling of an OFDM symbol at a reduced sampling rate, where the reduced sampling rate causes inter-symbol jitter between the plurality of OFDM symbols. The method further comprises determining a sample offset corresponding to a symbol number for the OFDM symbol, transforming the samples of the OFDM symbol into a plurality of frequency-domain resource elements, and determining a phase offset for each of the resource elements using the sample offset. The method then reduces the inter-symbol jitter by rotating each resource element using the corresponding phase offset to generate phase-rotated resource elements.

Another exemplary embodiment comprises a narrow-band wireless receiver configured to reduce inter-symbol jitter caused while processing each of a plurality of OFDM symbols in a received signal. The narrow-band wireless receiver comprises a receiver interface circuit, a frequency transformation circuit, and a jitter compensation circuit. The receiver interface circuit is configured to, for each of the plurality of OFDM symbols, receive a plurality of radio samples produced by a sampling of an OFDM symbol at a reduced sampling rate, where the reduced sampling rate causes inter-symbol jitter between the OFDM symbols. The frequency transformation circuit is configured to, for each of the plurality of OFDM symbols, transform the samples of the OFDM symbol into a plurality of frequency-domain resource elements. The jitter compensation circuit is configured to, for each of the plurality of OFDM symbols, determine a sample offset corresponding to a symbol number for the OFDM symbol, determine a phase offset for each of the resource elements using the sample offset, and reduce the inter-symbol jitter by rotating each resource element using the corresponding phase offset to generate phase-rotated resource elements.

Another exemplary embodiment comprises a jitter compensation circuit for reducing inter-symbol jitter caused while processing a plurality of radio samples produced by a sampling of each of a plurality of OFDM symbols in a received radio signal at a reduced sampling rate, where the reduced sampling rate causes inter-symbol jitter between the OFDM symbols. The jitter compensation circuit is configured to, for each of the plurality of OFDM symbols, receive a plurality of frequency-domain resource elements derived from a frequency transformation of the radio samples of an OFDM symbol, determine a sample offset corresponding to a symbol number for the OFDM symbol, determine, using the sample offset, a phase offset for each of the resource elements, and reduce the inter-symbol jitter by rotating each resource element using the corresponding phase offset to generate phase-rotated resource elements.

Another exemplary embodiment comprises a computer program product stored in a non-transitory computer readable medium for controlling a jitter compensation circuit to reduce inter-symbol jitter caused while processing a plurality of radio samples produced by a sampling of each of a plurality of OFDM symbols in a received radio signal at a reduced sampling rate, where the reduced sampling rate causes inter-symbol jitter between the OFDM symbols. The computer program product comprises software instructions which, when run on the jitter compensation circuit causes the jitter compensation circuit to, for each of the plurality of OFDM symbols, receive a plurality of frequency-domain resource elements derived from a frequency transformation of the radio samples of an OFDM symbol, determine a sample offset corresponding to a symbol number for the OFDM symbol, determine, using the sample offset, a phase offset for each of the resource elements, and reduce the inter-symbol jitter by rotating each resource element using the corresponding phase offset to generate phase-rotated resource elements.

Another exemplary embodiment comprises a narrow-band wireless receiver apparatus configured to reduce inter-symbol jitter caused while processing each of a plurality of OFDM symbols in a received signal. The narrow-band wireless receiver apparatus comprises a receiver interface module, a frequency transformation module, and a jitter compensation module. The receiver interface module is configured to, for each of the plurality of OFDM symbols, receive a plurality of radio samples produced by a sampling of an OFDM symbol at a reduced sampling rate, where the reduced sampling rate causes inter-symbol jitter between the OFDM symbols. The frequency transformation module is configured to, for each of the plurality of OFDM symbols, transform the samples of the OFDM symbol into a plurality of frequency-domain resource elements. The jitter compensation module is configured to, for each of the plurality of OFDM symbols, determine a sample offset corresponding to a symbol number for the OFDM symbol, determine a phase offset for each of the resource elements using the sample offset, and reduce the inter-symbol jitter by rotating each resource element using the corresponding phase offset to generate phase-rotated resource elements.

DETAILED DESCRIPTION

For cost and power savings it is desirable to design the wireless communication device supporting narrow band (NB) operations, e.g., NB-IoT, to operate using as low sampling rate as possible. The sampling rate for the smallest LTE cell bandwidth is typically 1.92 mega samples per second (MS/s), for which the normal cyclic prefix becomes 10 samples for the first OFDM symbol in a slot and 9 samples in the remaining OFDM symbols. Because there is no common divisor other than 1 for 10 and 9, it means that when sampling the NB-IoT cell with lower sampling rate than 1.92 MS/s, the inter-symbol distance can no longer be represented by an integer number of samples, and thus one or both of the cyclic prefix lengths will become a rational non-integer number of samples.

As a consequence jittering will result with respect to the sampled OFDM symbol start positions. The jittering may impact the channel estimation as well as may be interpreted as timing drift, both of which may degrade the receiver performance. Moreover the jittering impacts serving cell and/or neighbor cell measurement performance.

Methods such as compensating for the jitter already when acquiring the radio samples in the radio do not work when intra-frequency neighbor cells, typically having a different timing compared to serving cell are to be measured simultaneously with data reception, and would therefore call for additional radio time to carry out the neighbor cell measurements. Longer radio time results in larger power consumption and would therefore shorten the time at which the NB-IoT device can operate before the battery has to be replaced or recharged.

Hence there is a need for a method and an apparatus that enables a receiver to operate at minimum sampling rate without suffering from effects of fractional sample offsets, while at the same time allowing simultaneous data reception and intra-frequency neighbor cell measurements, as well as inter-frequency neighbor cell measurements.

Figure 1:
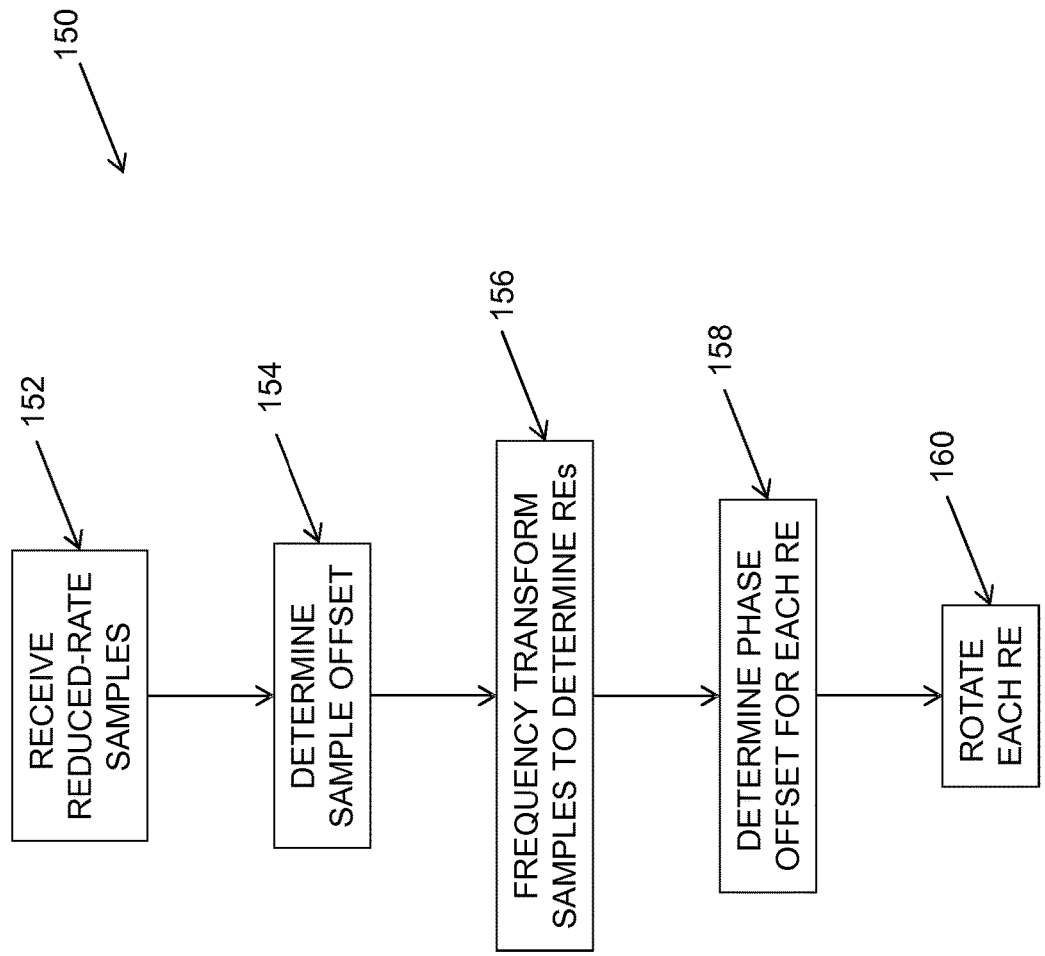
FIG. 1 shows a method for reducing inter-symbol jitter according to one exemplary embodiment.
Figure 2:
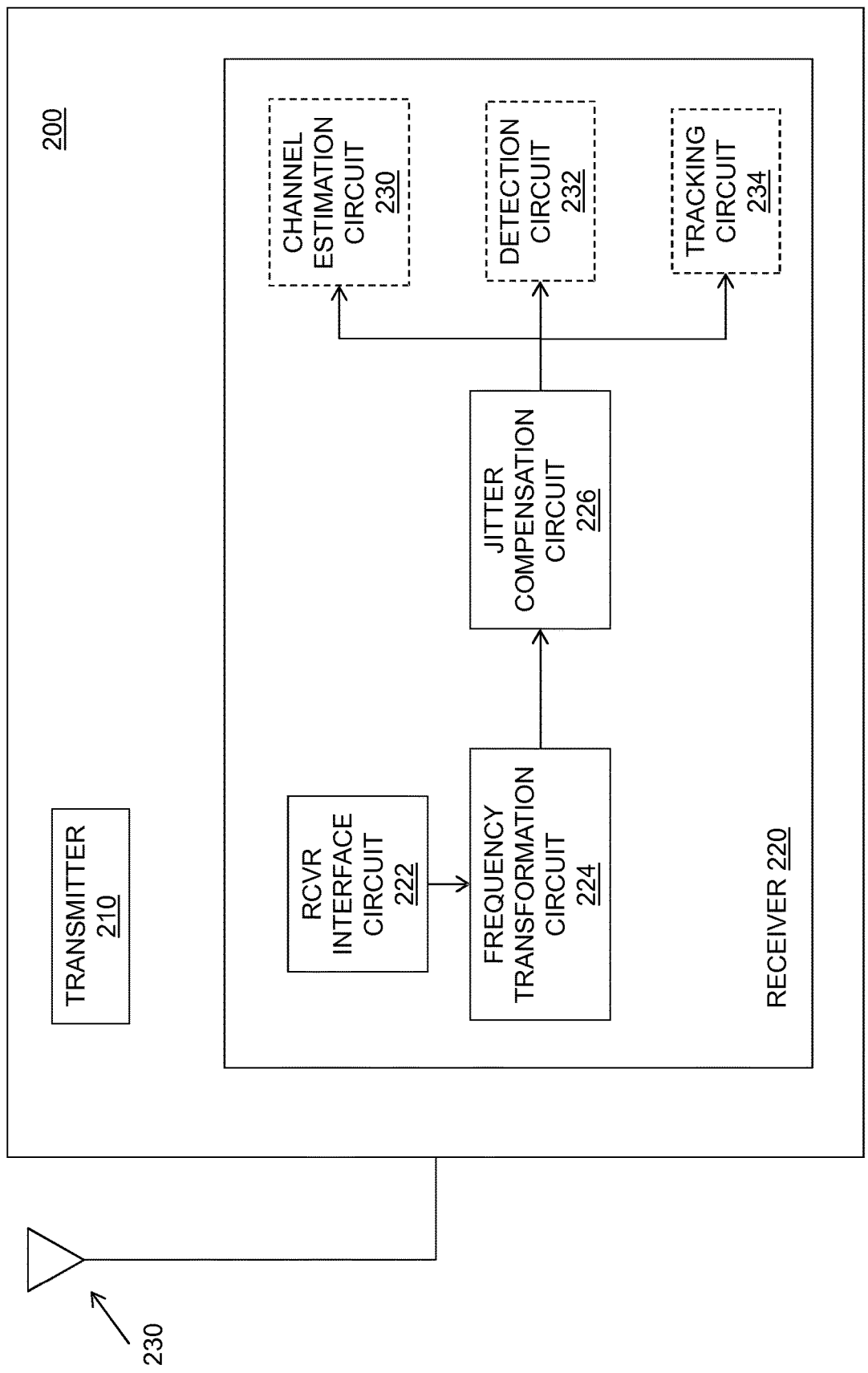
FIG. 2 shows a block diagram of an exemplary transceiver, e.g., a NB-IoT transceiver.

FIG. 1 shows one exemplary method 150 for processing signals received by such a narrow-band wireless communication device, e.g., the wireless communication device 200 of FIG. 2. The following generally describes the embodiments referring to both FIGS. 1 and 2. In some embodiments, the device may include, but is not limited to, a tablet, personal computer, mobile telephone, set-top box, sensor, and camera.

Wireless communication device 200 includes a transmitter 210 and receiver 220 that wirelessly communicate with remote devices/networks via an antenna 230 according to NB operations, e.g., NB-IoT operations. Transmitter 210 generates radio frequency (RF) signals according to any appropriate wireless communication procedures and/or standards, and conveys those RF signals to the antenna 230 for transmission to a remote device, network node, etc. Receiver 220 receives wireless signals from antenna 230, e.g., NB-IoT signals, and processes them according to the appropriate communication procedures and/or standards.

According to the solution presented herein, receiver 220 reduces inter-symbol jitter between OFDM symbols in a signal received by antenna 230, where the inter-symbol jitter is at least partially caused when the receiver 220 samples the OFDM symbols at a reduced sampling rate that is less than a minimum sampling rate, where the minimum sampling rate is the lowest sampling rate at which an inter-symbol distance can be represented by an integer number of samples. To that end, and for each of the received OFDM symbols, the receiver 220 executes method 150 of FIG. 1. The receiver 220 receives a plurality of radio samples produced by a sampling of an OFDM symbol (i.e., one of the received OFDM symbols) at the reduced sampling rate (block 152). In one embodiment, the radio samples are produced by an equidistant sampling of the OFDM symbol. The receiver 220 determines a sample offset corresponding to a symbol number for the OFDM symbol (block 154), transforms the samples of the OFDM symbol into a plurality of frequency-domain resource elements (block 156), where each resource element (RE) contains the information carried by one subcarrier of an OFDM symbol. The receiver 220 then determines a phase offset for each of the resource elements using the sample offset (block 158). In one exemplary embodiment, the receiver 220 may determine the phase offset using the sample offset and a frequency of the corresponding resource element. To reduce the inter-symbol jitter, the receiver 220 rotates each resource element using the corresponding phase offset to generate phase-rotated resource elements (block 160). For example, the receiver 220 may rotate each resource element by a conjugate of the corresponding phase offset.

To implement the method 150 of FIG. 1, the receiver 220 may comprise a receiver interface circuit 222, frequency transformation circuit 224, and jitter compensation circuit 226. For each of the received OFDM symbols, the receiver interface circuit 222 receives a plurality of radio samples produced by a sampling of an OFDM symbol (e.g., one of the received OFDM symbols) at a reduced sampling rate, where the reduced sampling rate causes the inter-symbol jitter between the OFDM symbols. In one embodiment, the radio samples are produced by an equidistant sampling of the OFDM symbol. The frequency transformation circuit 224 transforms the samples of the OFDM symbol into a plurality of frequency-domain resource elements. For example, the frequency transformation circuit 224 may comprise a Fast Fourier Transform (FFT) circuit, e.g., a 16 point FFT circuit. The jitter compensation circuit 226 determines a sample offset corresponding to a symbol number for the OFDM symbol, and determines a phase offset for each of the resource elements using the sample offset. In some embodiments, the jitter compensation circuit 226 may determine the phase offset using the sample offset and a frequency of the corresponding resource element. The jitter compensation circuit 226 then reduces the inter-symbol jitter by rotating each resource element using the corresponding phase offset to generate phase-rotated resource elements. For example, the jitter compensation circuit 226 may rotate each resource element by a conjugate of the corresponding phase offset.

In some embodiments, receiver 220 may also optionally include additional processing circuits that use the phase-rotated resource elements to generate information useful to the receiver for processing data. For example, the receiver 220 may optionally include a channel estimation circuit 230, a detection circuit 232, and/or a tracking circuit 234. The channel estimation circuit 230 uses the phase-rotated resource elements to generate channel estimates. Detection circuit 232 uses the phase-rotated resource elements detect one or more neighbor cells. Tracking circuit 234 uses the phase-rotated resource elements to track changes in timing of a neighbor cell timing. It will be appreciated that the phase-rotated resource elements used by the channel estimation circuit 230 may be the same as or different from the phase-rotated resource elements used by the detection circuit 232 and/or tracking circuit 234. In some embodiments, the channel estimation circuit 230 may use first phase-rotated resource elements, while the detection circuit 232 and/or tracking circuit 234 may use second phase-rotated resource elements. In this case, the first phase-rotated resource elements are generated for OFDM symbols received from a serving cell and used by the channel estimation circuit 230 to generate channel estimates for the serving cell, while the second phase-rotated resource elements are generated for OFDM symbols received from a neighbor cell and used by the detection circuit 232 and/or tracking circuit 234 to generate information about the neighbor cell. When different phase-rotated resource elements are generated for different cells, it will be appreciated that the receiver 220 may use the same circuitry in serial to generate the phase-rotated resource elements for the different cells, or the receiver 220 may include multiple sets of the interface, frequency transformation, and jitter compensation circuitry that operate in parallel to generate the phase-rotated resource elements for the different cells.

Figure 3:
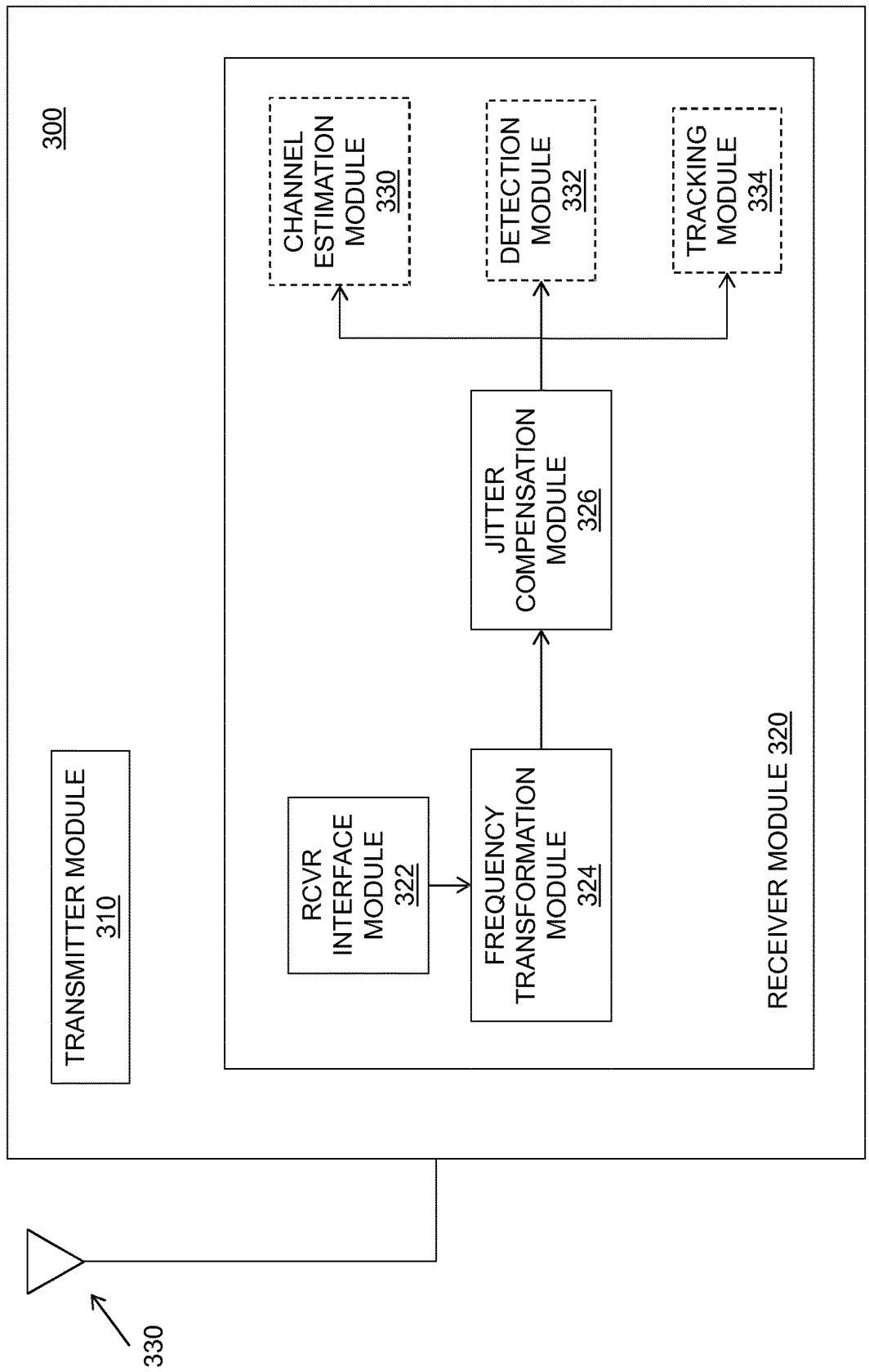
FIG. 3 shows a block diagram of another exemplary transceiver, e.g., a NB-IoT transceiver.
Figure 4:
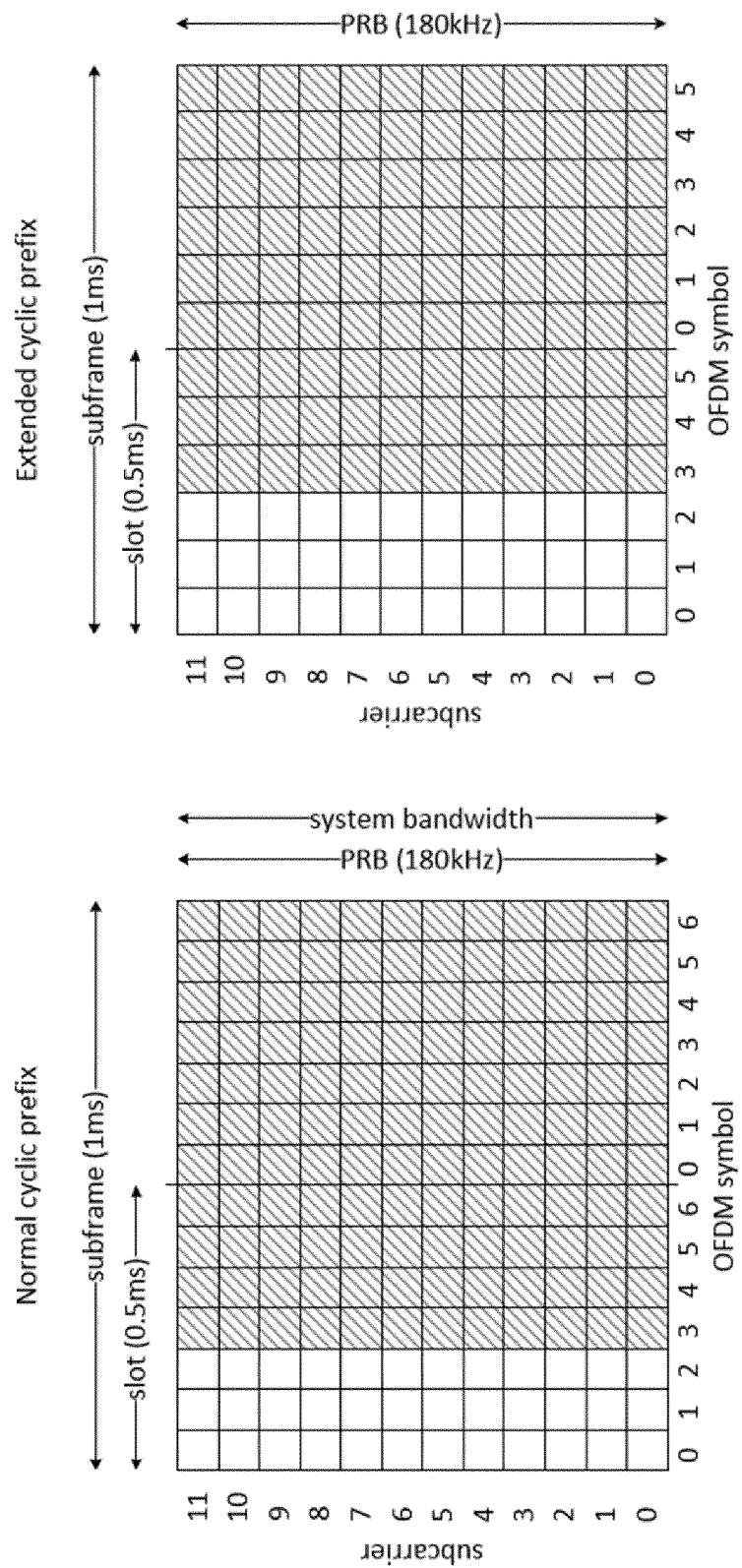
FIG. 4 shows exemplary downlink resource grids for NCP and ECP.

It will be appreciated that other devices may implement the method 150 of FIG. 1. For example, the wireless communication apparatus 300 shown in FIG. 3 may comprise the illustrated transmitter module 310, receiver module 320, and antenna 330, where the receiver module 320 may use the illustrated receiver interface module 322, frequency transformation module 324, and jitter compensation module 326 to implement the method 150 to reduce the inter-symbol jitter between received OFDM symbols. Similarly, the receiver 320 may include a channel estimation module 330, detection module 332, and/or tracking module 334 to perform the channel estimation, detection, and/or tracking operations described herein.

Those of skill in the art will also readily recognize that the method 150 described herein may be implemented as stored computer program instructions for execution by one or more computing devices, e.g., microprocessors, Digital Signal Processors (DSPs), FPGAs, ASICs, or other data processing circuits. The stored program instructions may be stored on machine-readable media, e.g., electrical, magnetic, or optical memory devices. The memory devices may include ROM and/or RAM modules, flash memory, hard disk drives, magnetic disc drives, optical disc drives and other storage media known in the art. For example, method 150 may be implemented using a jitter compensation processor comprising software instructions that when run on the jitter compensation processor cause the jitter compensation processor to execute the method 150 of FIG. 1. Further, the jitter compensation processor may execute software instructions to perform the channel estimation, detection, and/or tracking functions described herein.

The solution presented herein concerns phase compensation for jittering in the OFDM symbol start timing arising from sampling at lower sampling rate than 1.92 MS/s when receiving cells, e.g. 240, 320 or 480 kilo samples per second (kS/s). The solution presented herein may be used for serving cell measurements, serving cell data reception, and/or neighbor cell measurements.

The solution presented herein allows a lower sampling rate, e.g. 240, 320 or 480 kS/s, to be used by the NB-IoT wireless radio device. This in turn allows a cheaper device to be implemented because using the lower sampling rate requires less memory for buffering and/or a less powerful Digital Signal Processor (DSP) and/or Central Processing Unit (CPU) than if receiving and processing samples acquired at 1.92 MS/s. Further, using the lowered sampling rate also results in lower power consumption.

In some embodiments, solution presented herein allows simultaneous data reception and intra-frequency neighbor cell measurements, and thereby significantly reduces the radio time compared to approaches where the jitter is compensated is already in the radio, which can only be done for one cell timing at a time (serving cell or a neighbor cell).

For normal cyclic prefix configuration, the cyclic prefix of the first OFDM symbol in a slot is 160 $T_S$, and for the remaining OFDM symbols in the slot the cyclic prefix is 144 $T_S$, where $T_S=1/(15000.2048)$ seconds represents the fundamental time unit used in LTE. The length of a net OFDM symbol is 2048 $T_S$. At the lowest sampling rate assumed in a regular LTE system, 1.92 MS/s, the normal cyclic prefix becomes 10 samples for the first OFDM symbol in each slot and 9 samples for the remaining OFDM symbols, and the net OFDM symbol as such becomes 128 samples.

Figure 5:
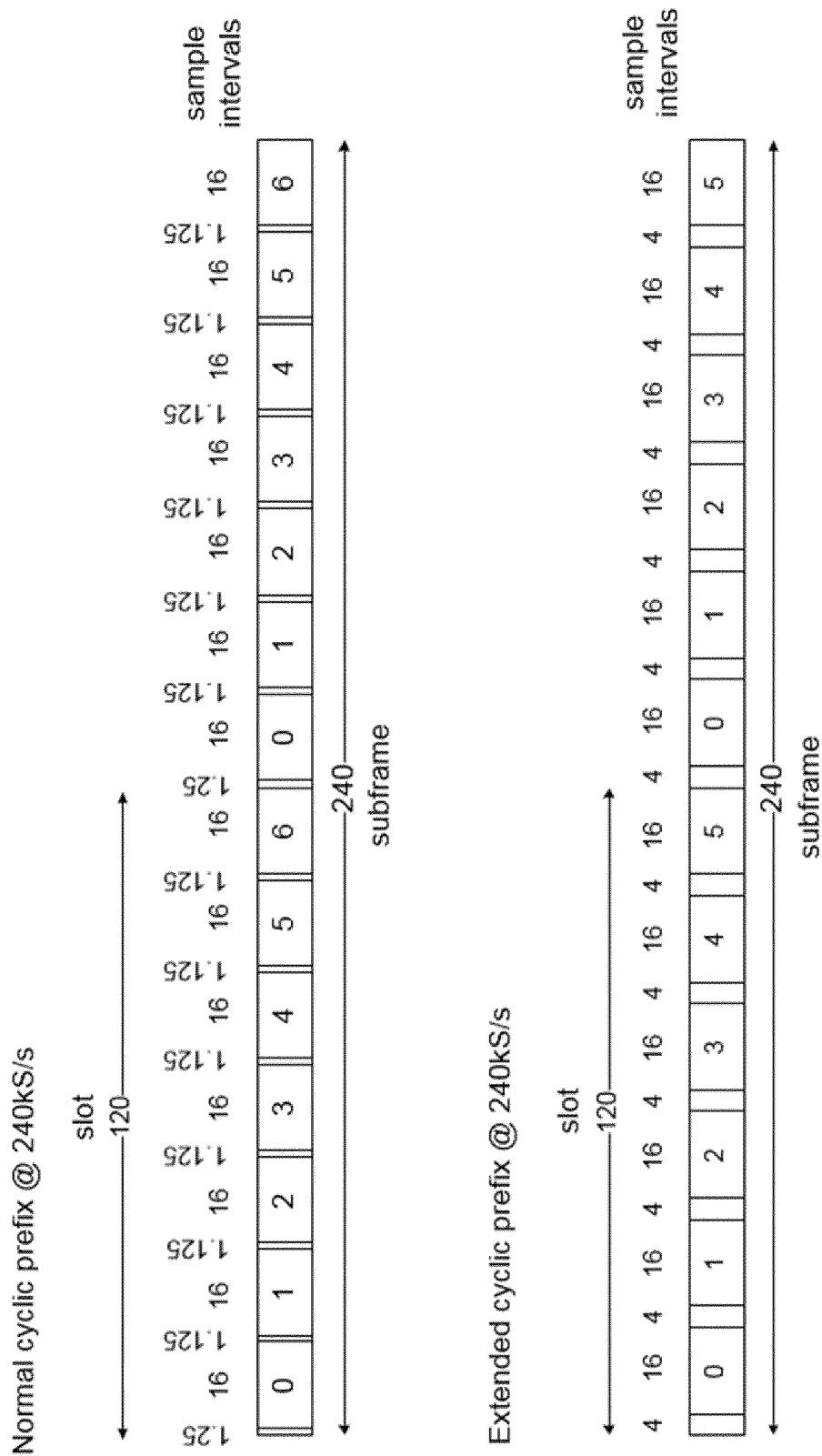
FIG. 5 shows exemplary OFDM symbol positions for NCP and ECP.
Figure 6:
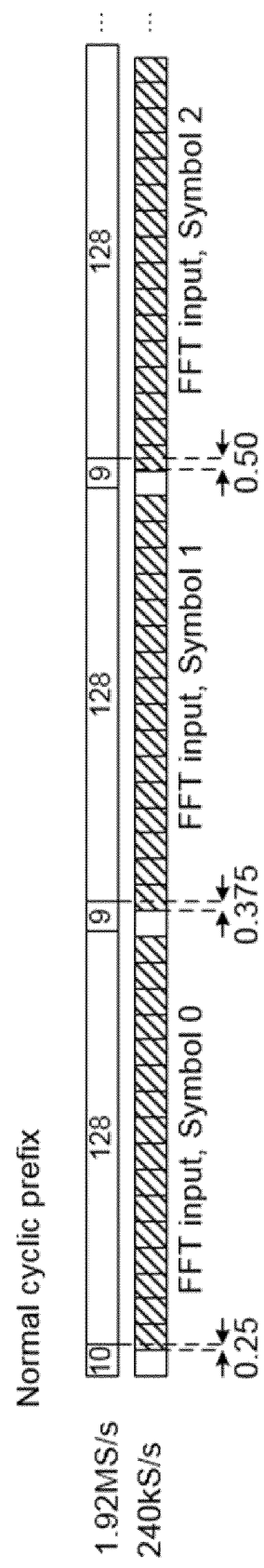
FIG. 6 shows exemplary symbol start offset jitter for NCP.

There is no non-trivial integer common divider between 10 and 9. Thus, if the sampling rate is reduced further on the receiver side, the normal cyclic prefixes will be fractional. For example, when reducing the sampling rate by a factor 8 to 240 kS/s, by which each net OFDM symbol is 16 samples, the normal cyclic prefix becomes 1.25 samples for the first OFDM symbol in a slot and 1.125 samples in the remaining OFDM symbols. This introduces a timing jitter that also impacts the OFDM symbol start position in the receiver. For the extended cyclic prefix the length becomes 4 samples hence no jitter arises in that case. See FIG. 5, which shows OFDM symbol positions in a subframe for normal and extended cyclic prefix configurations, and Table 1, which shows symbol start positions and offsets relative to the start of the net OFDM symbol at 240 kS/s. The symbol start offset jitter effect for a sampling rate of 240 kS/s is further illustrated in FIG. 6. It shall be noted that this jitter is deterministic with a periodicity of one slot, and that a slot can be represented by an integer number of samples. Hence this scenario differs from the cases where jitter is caused, e.g., by jitter in the clocking (such effects will come on top of the jitter discussed here).

The same problem is likely not experienced on the network node side because, at least for the in-band and guard band cases, it is anticipated that the NB-IoT cell will be handled by the same network node that handles the regular LTE cell that is either overlapping or adjacent in frequency to the NB-IoT cell, and which therefore will operate on at least 1.92 MS/s.

TABLE 1

FFT start positions and offset

| | Normal cyclic prefix | | Extended cyclic prefix | |
|---|---|---|---|---|
| Symbol | Symbol start [sample] | Offset [samples] | Symbol start [sample] | Offset [samples] |
| slot 0 | | | | |
| 0 | 1 | −0.25 | 2 | −2 |
| 1 | 18 | −0.375 | 22 | −2 |
| 2 | 35 | −0.5 | 42 | −2 |
| 3 | 52 | −0.625 | 62 | −2 |
| 4 | 69 | −0.75 | 82 | −2 |
| 5 | 86 | −0.875 | 102 | −2 |
| 6 | 103 | −1 | — | — |
| slot 1 | | | | |
| 0 | 121 | −0.25 | 122 | −2 |
| 1 | 138 | −0.375 | 142 | −2 |
| 2 | 155 | −0.5 | 162 | −2 |
| 3 | 172 | −0.625 | 182 | −2 |
| 4 | 189 | −0.75 | 202 | −2 |
| 5 | 206 | −0.875 | 222 | −2 |
| 6 | 223 | −1 | — | — |

Figure 7:
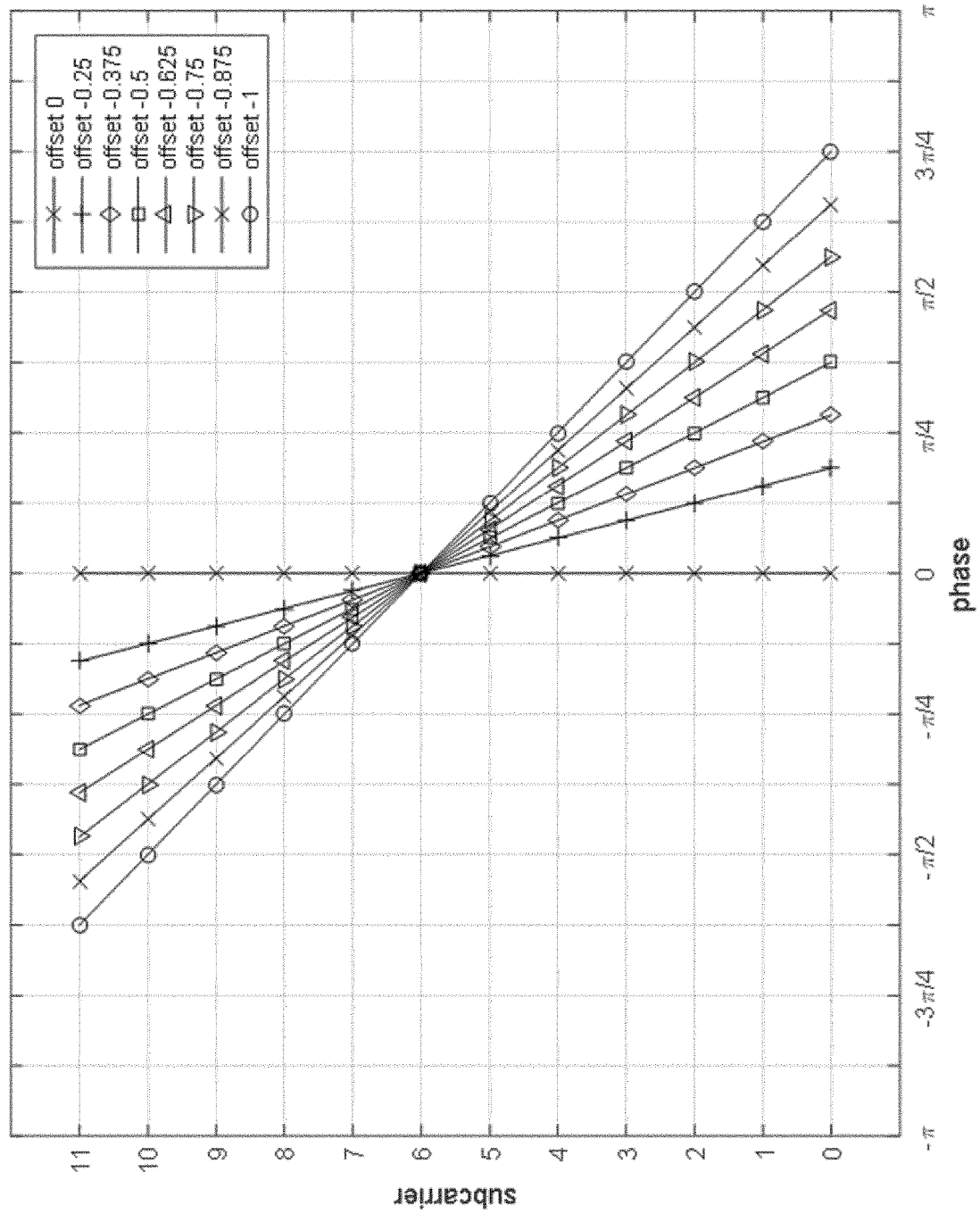
FIG. 7 shows exemplary phase impact caused by inter-symbol jitter.

Because the cyclic prefix constitutes a periodic extension of the net OFDM symbol deviation from the net OFDM symbol start into the cyclic prefix, the lower sampling rate introduces linear phase when the time-domain OFDM symbol is transformed into frequency-domain Resource Elements (REs). As a design guideline in OFDM systems that utilize a cyclic prefix, the OFDM symbol start shall be taken in the middle of the cyclic prefix to reduce inter-symbol interference. For the extended cyclic prefix and the chosen sampling rate 240 kS/s, the linear phase will be the same for all OFDM symbols since the offset is constant (Table 1), but for the normal cyclic prefix configuration, due to fractional length of the cyclic prefix, the linear phase component will vary on OFDM symbol basis in a deterministic manner. REs on different subcarriers will see different phase impact, as shown in FIG. 7, which shows the phase impact when the sampling rate is 240 kS/s for a 16 point FFT.

According to the solution presented herein, compensation for the jitter is applied after the time domain OFDM symbol has been transformed into frequency domain REs. The compensation comprises multiplying each RE with the conjugate of the linear phase that arises due to the jitter in the starting position of the OFDM symbol. The relationship between a time-domain offset and the phase impact on a particular RE may be given by:

$$\varphi(m, k) = e^{j2\pi \frac{\Delta_m}{N}(k-6)}, k = 0 \ldots 11 \quad (1)$$

where $\Delta_m$ represents the OFDM symbol sampling offset for the $m^{th}$ OFDM symbol in a slot (Table 1), N represents the length of a net OFDM symbol under the chosen sampling rate (e.g., 16 when the sampling rate is 240 kS/s), and k represents the subcarrier index. Here it is assumed that subcarrier 6 is the Direct Current (DC) carrier (thus the k−6 part of the equation), and further, that unlike regular LTE, the DC carrier is not discarded. The embodiments may easily be adapted to other scenarios where, e.g., the DC carrier is discarded and/or any other subcarrier is the DC carrier. Compensating for the jitter for the $k^{th}$ subcarrier of the $m^{th}$ OFDM symbol in a slot thus comprises multiplying the corresponding RE by $\varphi^*(\Delta_{m,k})$, where * denotes complex conjugation.

Figure 8:
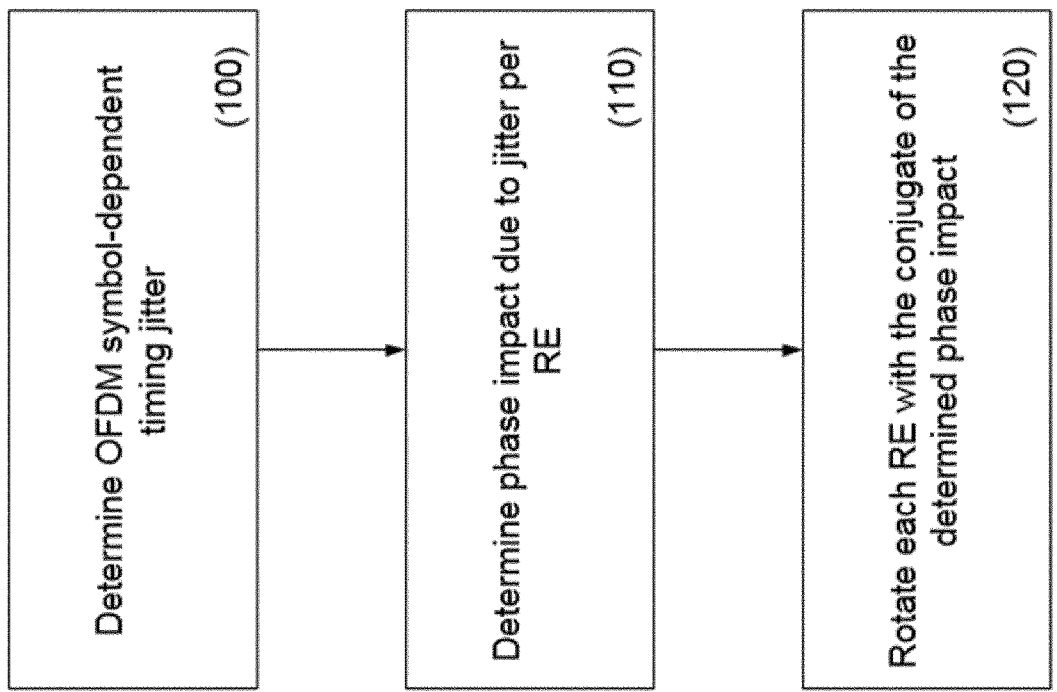
FIG. 8 shows a method for reducing inter-symbol jitter according to one exemplary embodiment.

FIG. 8 shows one exemplary flowchart of the solution presented herein. In this exemplary solution, the receiver determines the OFDM symbol number and the associated symbol start jitter for the cell to be received (block 100), determines the phase impact on each of the REs that results from the symbol start jitter (block 110), and rotates each RE by the conjugate of the determined phase impact (block 120). More particularly, the symbol start jitter determination of block 100 comprises determining, based on the sampling rate, how large the offset between the FFT input start and the start of the actual OFDM symbol will be for the give OFDM symbol number. This can be calculated in real time or can be retrieved from a predefined table, e.g., Table 1 above for the case 240 kS/s. The phase impact determination of block 110 comprises calculating the linear phase on a subcarrier basis that results from the symbol start offset that was determined in block 100. This can be calculated in real time (e.g., as $\varphi(m,k)$ above), or can be retrieved from a predefined table. The rotation of block 120 comprises, for each subcarrier, conjugating $\varphi(m,k)$ to produce $\varphi^*(m,k)$ and multiplying the RE for the $m^{th}$ OFDM symbol and the $k^{th}$ subcarrier by $\varphi^*(m,k)$, which removes the linear phase introduced by the symbol start offset. The process is repeated for all OFDM symbols in a TTI/subframe/slot (and hence different phase compensation per OFDM symbol in a Transmission Time Interval (TTI)/sub frame/slot).

Figure 9:
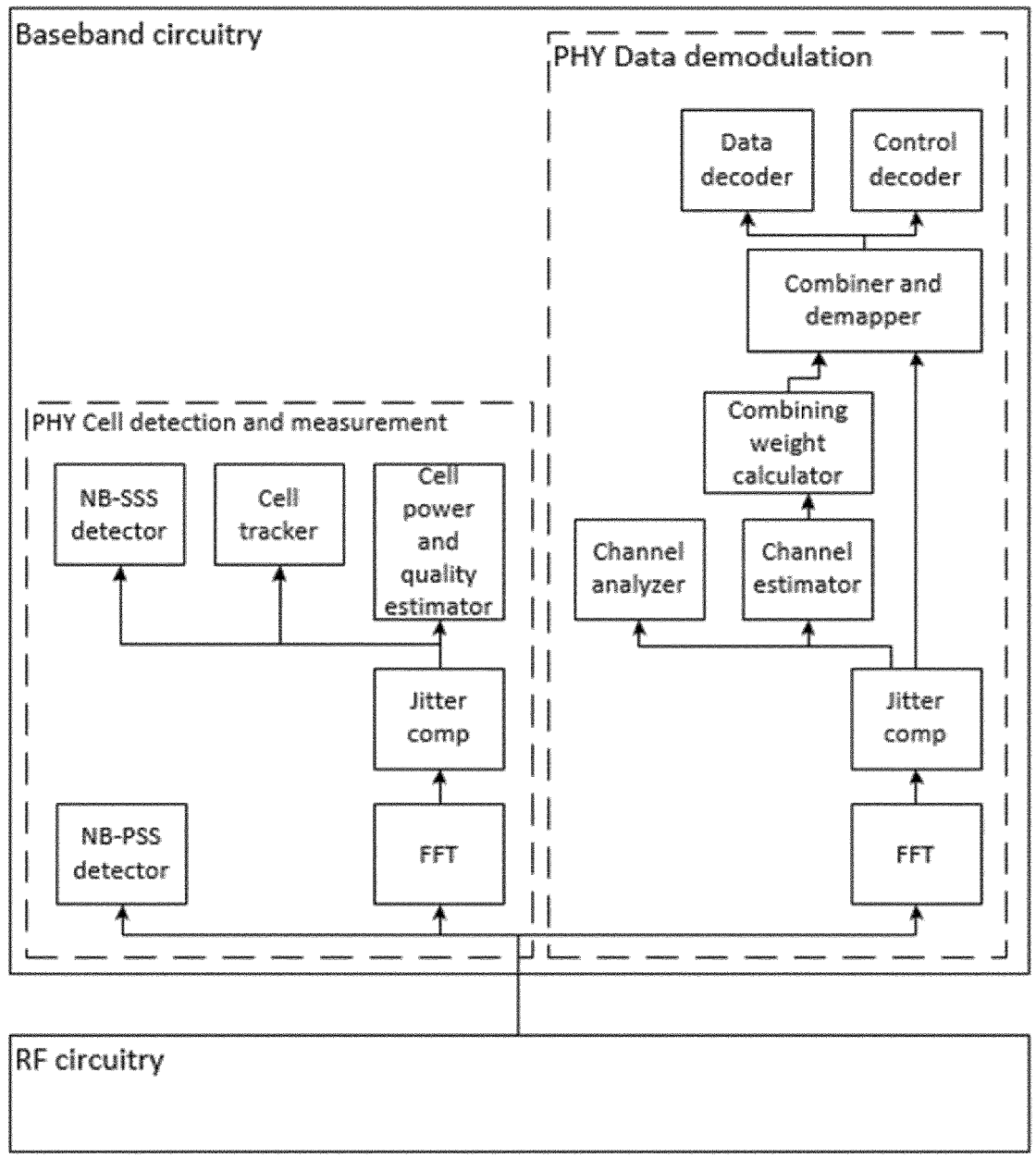
FIG. 9 shows a block diagram of an exemplary NB-IoT physical layer architecture.

FIG. 9 shows an exemplary NB-IoT physical layer (PHY) architecture for the relevant downlink parts. The RF circuitry delivers samples at, e.g., 240 kS/s to the baseband circuitry. The samples are used for data demodulation (common control, dedicated control, broadcasts, unicast and multicast data) by the PHY Data demodulation unit. Each time domain OFDM symbol that is to be demodulated is subjected to an FFT (16 point in case of 240 kS/s) and the 12 outputs that correspond to the 12 REs (due to 12 subcarriers) are fed to a Jitter compensation circuit/module (Jitter comp) that compensates for the symbol start jitter. Thereafter the REs are fed to the channel estimator, channel analyzer, and the combiner and demapper. The channel estimator estimates the propagation channel using prior known signals, e.g., pilots/reference symbols (that may be common or dedicated) or synchronization signals. In case two transmitter (TX) ports are used by the network node, there are two radio paths to the single RX antenna used by the NB-IoT device. The combining weight calculator unit takes the channel estimates and determines the optimum way of combining the data received over two radio paths. It provides combining weights to the combiner and demapper, which uses the weights when combining the data. The combiner and demapper converts the combined modulation symbols carried by the REs into softbits, which then are fed to the Data decoder or the control decoder for decoding.

The same samples that are received from the RF circuitry may also be used for detection of new intra-frequency neighbor cells, and/or for tracking and measurements of detected neighbor cells. The primary synchronization signal detection is carried out in the time domain by the NB-PSS detector. Once an NB-PSS has been detected, the identity of the detected cell is determined by detecting the associated NB-SSS which uniquely provides the physical layer identity of the cell. NB-SSS operates in the frequency domain and hence on transformed and jitter-compensated REs. When applying the embodiments on a neighbor cell, the OFDM symbol number m shall be determined with respect to the neighbor cell and not with the serving cell as above.

The signal strength and signal quality of detected neighbor cells are measured by the cell power and quality estimator in order to determine whether any of the neighbor cells would be more suitable as serving cell. The measurements are carried out on known signals, e.g., pilots/reference symbols (that may be common or dedicated) and/or synchronization signals, in the frequency domain. In certain implementations there may also be a separate cell tracking unit, which may be operating in the frequency domain tracking changes in cell timing of neighbor cells. Alternatively, it may be operating on time-domain data as input, in which case the embodiments are comprised also inside the cell tracking unit.

In case of inter-frequency neighbor cell detection and measurements, there is no simultaneous data reception from the serving cell. Here the solution is anyway beneficial since it allows measurements of multiple already detected inter-frequency neighbor cells to be carried out simultaneously while also searching for new cells. There are in general multiple cells visible to the NB-IoT device on each inter-frequency carrier, each cell typically with different frame timing. Had the sampling rate been adjusted in the radio to match the OFDM symbol starts for one of the neighbor cells, it would not be suitable for the other neighbor cells or for cell detection. As a consequence each cell measurement and the cell search activities would have had to be carried out in a sequential manner, leading to longer cell detection time and longer time trigger events. In many scenarios it would also increase the power consumption of the device, e.g., by having to use more radio time than had activities been done in parallel, or by consequences from staying too long in a suboptimal cell. With the solution presented herein, the acquired data can be used for all activities simultaneously and it is only buffering and processing capacities that put a limit on how many cells can be measured in parallel.

A method according to one exemplary embodiment is implemented in a receiver of a NB-IoT device, where the receiver operates at a sampling rate less than the rate required for acquiring a sequence of OFDM symbols without inter-symbol jitter. In this embodiment, the method comprises, on each individual OFDM symbol (for a respective cell) in a TTI/slot/sub frame, receiving radio samples sampled equidistantly, determining OFDM symbol number and associated jitter, determining the phase impact on each of the REs of the jitter, transforming the OFDM symbol into frequency domain (REs), and rotating each RE to remove the prior determined phase impact.

In one exemplary embodiment, the phase compensation per OFDM symbol is determined from a look up table, where the look up table is determined once the OFDM timing has been determined. In another exemplary embodiment, the phase compensation per OFDM symbol on a received set of samples (set of OFDM symbols) is made using a timing associated with a serving cell and using a timing on at least one other intra-frequency neighboring cell.

Various elements disclosed herein are described as or represent some kind of circuit, e.g., a transmitter, receiver, receiver interface circuit, frequency transformation circuit, jitter compensation circuit, channel estimation circuit, detection circuit, tracking circuit, etc. Each of these circuits may be embodied in hardware and/or in software (including firmware, resident software, microcode, etc.) executed on a controller or processor, including an application specific integrated circuit (ASIC).

Further embodiments are:
28. A jitter compensation circuit (226) for reducing inter-symbol jitter caused while processing a plurality of radio samples produced by a sampling of each of a plurality of Orthogonal Frequency Division Multiplex (OFDM) symbols in a received radio signal at a reduced sampling rate, where the reduced sampling rate causes inter-symbol jitter between the OFDM symbols, the jitter compensation circuit configured to, for each of the plurality of OFDM symbols:
receive a plurality of frequency-domain resource elements derived from a frequency transformation of the radio samples of an OFDM symbol;
determine a sample offset corresponding to a symbol number for the OFDM symbol, said sample offset representing a difference between an actual sample start time and a desired sample start time;
determine, using the sample offset, a phase offset for each of the resource elements; and reduce the inter-symbol jitter by rotating each resource element using the corresponding phase offset to generate phase-rotated resource elements.

29. The jitter compensation circuit of embodiment 28 wherein the jitter compensation circuit determines the phase offset by determining the phase offset for each of the resource elements using the sample offset and a frequency of the corresponding resource element.

30. The jitter compensation circuit of embodiments 28-29 wherein the jitter compensation circuit rotates each resource element by rotating each resource element by a conjugate of the phase offset.

31. The jitter compensation circuit of embodiments 28-30 wherein the reduced sampling rate is less than a minimum sampling rate at which an inter-symbol distance can be represented by an integer number of samples.

32. The jitter compensation circuit of embodiments 28-31 wherein the reduced sampling rate is less than 1.92 Mega samples per second.

33. The jitter compensation circuit of embodiments 28-32 wherein the radio samples are produced by an equidistant sampling of the OFDM symbol.

35. A narrow-band wireless receiver apparatus (320) configured to reduce inter-symbol jitter caused while processing each of a plurality of Orthogonal Frequency Division Multiplex (OFDM) symbols in a received signal, the narrow-band wireless receiver apparatus comprising:
a receiver interface module (322) configured to, for each of the plurality of OFDM symbols, receive a plurality of radio samples produced by a sampling of an OFDM symbol at a reduced sampling rate, where the reduced sampling rate causes inter-symbol jitter between the OFDM symbols;
a frequency transformation module (324) configured to, for each of the plurality of OFDM symbols, transform the samples of the OFDM symbol into a plurality of frequency-domain resource elements; and
a jitter compensation module (326) configured to, for each of the plurality of OFDM symbols:
determine a sample offset corresponding to a symbol number for the OFDM symbol, said sample offset representing a difference between an actual sample start time and a desired sample start time;
determine a phase offset for each of the resource elements using the sample offset; and reduce the inter-symbol jitter by rotating each resource element using the corresponding phase offset to generate phase-rotated resource elements.

36. The narrow-band wireless receiver apparatus of embodiment 35 wherein the jitter compensation module determines the phase offset by determining the phase offset for each of the resource elements using the sample offset and a frequency of the corresponding resource element.

37. The narrow-band wireless receiver apparatus of embodiments 35-36 wherein the jitter compensation module rotates each resource element by rotating each resource element by a conjugate of the corresponding phase offset.

38. The narrow-band wireless receiver apparatus of embodiments 35-37 wherein the reduced sampling rate is less than a minimum sampling rate at which an inter-symbol distance can be represented by an integer number of samples.

39. The narrow-band wireless receiver apparatus of embodiments 35-38 wherein the reduced sampling rate is less than 1.92 Mega samples per second.

40. The narrow-band wireless receiver apparatus of embodiments 35-39 wherein the phase-rotated resource elements correspond to a neighbor cell, the narrow-band wireless receiver further comprising a detection module (332) configured to detect the neighbor cell using the phase-rotated resource elements.

41. The narrow-band wireless receiver apparatus of embodiments 35-40 wherein the phase-rotated resource elements correspond to a neighbor cell, the narrow-band wireless receiver further comprising a tracking module (334) configured to track changes in a timing of the neighbor cell using the phase-rotated resource elements.

42. The narrow-band wireless receiver apparatus of embodiments 35-41 wherein the OFDM symbol comprises a first OFDM symbol received from a serving cell and wherein the phase-rotated resource elements correspond to the serving cell, the narrow-band wireless receiver further comprising a channel estimation module (330) configured to generate channel estimates for the serving cell using the phase-rotated resource elements.

43. The narrow-band wireless receiver apparatus of embodiment 42:
wherein the jitter compensation module is further configured to:
determine a second sample offset corresponding to a second symbol number for the second OFDM symbol;
transform the samples of the second OFDM symbol into a plurality of frequency-domain second resource elements;
determine a second phase offset for each of the second resource elements using the second sample offset; and
reduce the inter-symbol jitter by rotating each second resource element using the corresponding second phase offset to generate second phase-rotated resource elements; and
the narrow-band wireless receiver further comprising a detection module configured to detect one or more neighbor cells using the second phase-rotated resource elements.

44. The narrow-band wireless receiver apparatus of embodiment 42:
wherein the jitter compensation module is further configured to:
determine a second sample offset corresponding to a second symbol number for the second OFDM symbol;
transform the samples of the second OFDM symbol into a plurality of frequency-domain second resource elements;
determine a second phase offset for each of the second resource elements using the second sample offset; and
reduce the inter-symbol jitter by rotating each second resource element using the corresponding second phase offset to generate second phase-rotated resource elements; and the narrow-band wireless receiver further comprising a tracking module configured to track changes in a timing of the neighbor cell timing using the second phase-rotated resource elements.

45. The narrow-band wireless receiver apparatus of embodiment 44 further comprising a detection module configured to detect the neighbor cell using the second phase-rotated resource elements.

46. The narrow-band wireless receiver apparatus of embodiments 35-45 wherein the radio samples are produced by an equidistant sampling of the OFDM symbol.

47. The narrow-band wireless receiver apparatus of embodiments 35-46 wherein the narrow-band wireless receiver apparatus comprises a narrow-band internet-of-things wireless receiver apparatus.

48. The narrow-band wireless receiver apparatus of embodiments 35-47 wherein the narrow-band wireless receiver apparatus is comprised in a device.

49. The narrow-band wireless receiver apparatus of embodiment 48 wherein the device comprises one of a tablet, personal computer, mobile telephone, set-top box, sensor and camera.

The solution presented herein may, of course, be carried out in other ways than those specifically set forth herein without departing from essential characteristics of the embodiments. The present embodiments are to be considered in all respects as illustrative and not restrictive, and all changes coming within the meaning and equivalency range of the appended embodiments are intended to be embraced therein.

The invention claimed is:

1. A method of reducing inter-symbol jitter caused while processing each of a plurality of Orthogonal Frequency Division Multiplex (OFDM) symbols in a received signal, the method comprising, for each of the plurality of OFDM symbols:
receiving a plurality of radio samples produced by a sampling of an OFDM symbol at a reduced sampling rate, where the reduced sampling rate causes inter-symbol jitter between the plurality of OFDM symbols;
determining a sample offset corresponding to a symbol number for the OFDM symbol, said sample offset representing a difference between an actual sample start time and a desired sample start time;
transforming the samples of the OFDM symbol into a plurality of frequency-domain resource elements;
determining a phase offset for each of the resource elements using the sample offset; and
reducing the inter-symbol jitter by rotating each resource element using the corresponding phase offset to generate phase-rotated resource elements;
wherein the reduced sampling rate is less than a minimum sampling rate at which an inter-symbol distance can be represented by an integer number of samples.

2. The method of claim 1 wherein determining the phase offset comprises determining the phase offset for each of the resource elements using the sample offset and a frequency of the corresponding resource element.

3. The method of claim 1 wherein rotating each resource element comprises rotating each resource element by a conjugate of the corresponding phase offset.

4. The method of claim 1 wherein the reduced sampling rate is less than 1.92 Mega samples per second.

5. The method of claim 1 wherein the phase-rotated resource elements correspond to a neighbor cell, the method further comprising detecting the neighbor cell using the phase-rotated resource elements.

6. The method of claim 1 wherein the phase-rotated resource elements correspond to a neighbor cell, the method further comprising tracking changes in a timing of the neighbor cell using the phase-rotated resource elements.

7. The method of claim 1 wherein the OFDM symbol comprises a first OFDM symbol received from a serving cell and wherein the phase-rotated resource elements correspond to the serving cell, the method further comprising generating channel estimates for the serving cell using the phase-rotated resource elements.

8. The method of claim 7 further comprising:
determining a second sample offset corresponding to a second symbol number for the second OFDM symbol;
transforming the samples of the second OFDM symbol into a plurality of frequency-domain second resource elements;
determining a second phase offset for each of the second resource elements using the second sample offset;
reducing the inter-symbol jitter by rotating each second resource element using the corresponding second phase offset to generate second phase-rotated resource elements;
detecting one or more neighbor cells using the second phase-rotated resource elements.

9. The method of claim 7 further comprising:
determining a second sample offset corresponding to a second symbol number for the second OFDM symbol;
transforming the samples of the second OFDM symbol into a plurality of frequency-domain second resource elements;
determining a second phase offset for each of the second resource elements using the second sample offset; and
reducing the inter-symbol jitter by rotating each second resource element using the corresponding second phase offset to generate second phase-rotated resource elements;
tracking changes in a timing of the neighbor cell timing using the second phase-rotated resource elements.

10. The method of claim 9 further comprising detecting the neighbor cell using the second phase-rotated resource elements.

11. The method of claim 1 wherein the radio samples are produced by an equidistant sampling of the OFDM symbol.

12. A narrow-band wireless receiver configured to reduce inter-symbol jitter caused while processing each of a plurality of Orthogonal Frequency Division Multiplex (OFDM) symbols in a received signal, the narrow-band wireless receiver comprising:
a receiver interface circuit configured to, for each of the plurality of OFDM symbols, receive a plurality of radio samples produced by a sampling of an OFDM symbol at a reduced sampling rate, where the reduced sampling rate causes inter-symbol jitter between the OFDM symbols;
a frequency transformation circuit configured to, for each of the plurality of OFDM symbols, transform the samples of the OFDM symbol into a plurality of frequency-domain resource elements; and
a jitter compensation circuit configured to, for each of the plurality of OFDM symbols:
determine a sample offset corresponding to a symbol number for the OFDM symbol, said sample offset representing a difference between an actual sample start time and a desired sample start time;
determine a phase offset for each of the resource elements using the sample offset; and reduce the inter-symbol jitter by rotating each resource element using the corresponding phase offset to generate phase-rotated resource elements;

wherein the reduced sampling rate is less than a minimum sampling rate at which an inter-symbol distance can be represented by an integer number of samples.

13. The narrow-band wireless receiver of claim 12 wherein the jitter compensation circuit determines the phase offset by determining the phase offset for each of the resource elements using the sample offset and a frequency of the corresponding resource element.

14. The narrow-band wireless receiver of claim 12 wherein the jitter compensation circuit rotates each resource element by rotating each resource element by a conjugate of the corresponding phase offset.

15. The narrow-band wireless receiver of claim 12 wherein the reduced sampling rate is less than 1.92 Mega samples per second.

16. The narrow-band wireless receiver of claim 12 wherein the phase-rotated resource elements correspond to a neighbor cell, the narrow-band wireless receiver further comprising a detection circuit configured to detect the neighbor cell using the phase-rotated resource elements.

17. The narrow-band wireless receiver of claim 12 wherein the phase-rotated resource elements correspond to a neighbor cell, the narrow-band wireless receiver further comprising a tracking circuit configured to track changes in a timing of the neighbor cell using the phase-rotated resource elements.

18. The narrow-band wireless receiver of claim 12 wherein the OFDM symbol comprises a first OFDM symbol received from a serving cell and wherein the phase-rotated resource elements correspond to the serving cell, the narrow-band wireless receiver further comprising a channel estimation circuit (230) configured to generate channel estimates for the serving cell using the phase-rotated resource elements.

19. The narrow-band wireless receiver of claim 18:
wherein the jitter compensation circuit is further configured to:
determine a second sample offset corresponding to a second symbol number for the second OFDM symbol;
transform the samples of the second OFDM symbol into a plurality of frequency-domain second resource elements;
determine a second phase offset for each of the second resource elements using the second sample offset; and
reduce the inter-symbol jitter by rotating each second resource element using the corresponding second phase offset to generate second phase-rotated resource elements; and
the narrow-band wireless receiver further comprising a detection circuit configured to detect one or more neighbor cells using the second phase-rotated resource elements.

20. The narrow-band wireless receiver of claim 18:
wherein the jitter compensation circuit is further configured to:
determine a second sample offset corresponding to a second symbol number for the second OFDM symbol;
transform the samples of the second OFDM symbol into a plurality of frequency-domain second resource elements;
determine a second phase offset for each of the second resource elements using the second sample offset; and
reduce the inter-symbol jitter by rotating each second resource element using the corresponding second phase offset to generate second phase-rotated resource elements; and
the narrow-band wireless receiver further comprising a tracking circuit configured to track changes in a timing of the neighbor cell timing using the second phase-rotated resource elements.

21. The narrow-band wireless receiver of claim 20 further comprising a detection circuit configured to detect the neighbor cell using the second phase-rotated resource elements.

22. The narrow-band wireless receiver of claim 12 wherein the radio samples are produced by an equidistant sampling of the OFDM symbol.

23. The narrow-band wireless receiver of claim 12 wherein the narrow-band wireless receiver comprises a narrow-band internet-of-things wireless receiver.

24. The narrow-band wireless receiver of claim 12 wherein the narrow-band wireless receiver is comprised in a device.

25. The narrow-band wireless receiver of claim 24 wherein the device comprises one of a tablet, personal computer, mobile telephone, set-top box, sensor and camera.

26. A non-transitory computer readable medium storing a computer program product for controlling a jitter compensation circuit to reduce inter-symbol jitter caused while processing a plurality of radio samples produced by a sampling of each of a plurality of Orthogonal Frequency Division Multiplex (OFDM) symbols in a received radio signal at a reduced sampling rate, where the reduced sampling rate causes inter-symbol jitter between the OFDM symbols, the computer program product comprising software instructions which, when run on the jitter compensation circuit causes the jitter compensation circuit to, for each of the plurality of OFDM symbols:
receive a plurality of frequency-domain resource elements derived from a frequency transformation of the radio samples of an OFDM symbol;
determine a sample offset corresponding to a symbol number for the OFDM symbol, said sample offset representing a difference between an actual sample start time and a desired sample start time;
determine, using the sample offset, a phase offset for each of the resource elements; and
reduce the inter-symbol jitter by rotating each resource element using the corresponding phase offset to generate phase-rotated resource elements;
wherein the reduced sampling rate is less than a minimum sampling rate at which an inter-symbol distance can be represented by an integer number of samples.

* * * * *